(12) United States Patent
Akahoshi et al.

(10) Patent No.: US 8,347,642 B2
(45) Date of Patent: Jan. 8, 2013

(54) HVAC CONTROLLER FOR VEHICLE (75) Inventors: Nobuyuki Akahoshi, Wako (JP); Kazuhito Aizawa, Wako (JP); Kanao Kogure, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 771 days.

(21) Appl. No.: 12/274,813

(22) Filed: Nov. 20, 2008

(65) Prior Publication Data

US 2009/0145141 A1 Jun. 11, 2009

(30) Foreign Application Priority Data

Dec. 10, 2007 (JP) ................................. 2007-318769
Dec. 10, 2007 (JP) ................................. 2007-318770

(51) Int. Cl.
*B60H 1/00* (2006.01)
*B60H 1/02* (2006.01)
*B60H 1/32* (2006.01)

(52) U.S. Cl. ............................... 62/133; 62/230; 62/236

(58) Field of Classification Search ................ 62/133, 62/230, 236
See application file for complete search history.

(56) References Cited

U.S. PATENT DOCUMENTS

| 5,934,089 A | * | 8/1999 | Nakagawa et al. | 62/133 |
| 6,073,456 A | * | 6/2000 | Kawai et al. | 62/133 |
| 6,895,917 B2 | * | 5/2005 | Itoh et al. | 123/179.4 |
| 2004/0020229 A1 | * | 2/2004 | Adachi et al. | 62/236 |

FOREIGN PATENT DOCUMENTS

| JP | 4-358729 A | 12/1992 |
| JP | 11-198644 A | 7/1999 |

* cited by examiner

*Primary Examiner* — Cheryl J Tyler
*Assistant Examiner* — Jonathan Bradford
(74) *Attorney, Agent, or Firm* — Westerman, Hattori, Daniels & Adrian, LLP (57) ABSTRACT

A controller for a vehicle includes an in-passenger-compartment temperature sensor which detects the temperature of the air supplied to an evaporator by actuating a blower fan, an outside air temperature sensor, an evaporator temperature sensor which detects the temperature of the evaporator, and an engine stop duration determiner which determines an engine stop duration on the basis of the temperature detected by the evaporator temperature sensor immediately before an engine stops and the temperatures detected by the outside air temperature sensor and the in-passenger-compartment temperature sensor. An engine control unit continues the operation of the blower fan after a stop condition holds and the engine is stopped, and then restarts the engine and actuates a compressor when the engine stop duration has elapsed.

5 Claims, 7 Drawing Sheets

HVAC CONTROLLER FOR VEHICLE

BACKGROUND OF THE INVENTION

1. Field of the Invention

The present invention relates to a controller for a vehicle which stops an engine mounted in a vehicle when a stop condition holds while the engine is in operation, and then restarts the engine when a start condition holds while the engine is at rest.

2. Description of the Related Art

Hitherto, there has been known a controller for a vehicle adapted to temporarily stop an engine while a vehicle is at rest thereby to restrain fuel consumption from idling while the vehicle is at rest (refer to, for example, Japanese Patent Application Laid-Open No. H4-358729).

In a conventional controller for a vehicle, an engine is stopped when the vehicle speed reaches zero and the vehicle stops and the clutch switch turns off (i.e., when a stop condition holds), and the engine is restarted when a predetermined time has elapsed following the engine stop (i.e., when a start condition holds).

Further, in the conventional controller for a vehicle, the predetermined time, which is an engine start condition, has been set at a fixed time.

Here, when the passenger compartment is being air conditioned from the engine in operation, if the engine is stopped and air conditioning is stopped accordingly, then the temperature in the passenger compartment gradually rises. If the time from the stop to the restart of the engine is fixed, as with the conventional controller for a vehicle, the temperature in the passenger compartment may rapidly rise when, for example, an outside air temperature is high or many passengers are in the passenger compartment, causing the passengers in the passenger compartment to feel uncomfortable by the time the engine is restarted and the air conditioning is resumed.

Further, when a coolant is being circulated in a coolant circulation passage via a radiator of the engine by a pump driven by the engine and the air to be blown out into the passenger compartment through the intermediary of a heat exchanger connected to the coolant circulation passage is being heated to perform heating, if the engine is stopped and the pump is stopped accordingly, then the temperature in the passenger compartment gradually drops.

If the time from the stop to the restart of the engine is fixed, as with the conventional controller for a vehicle, then the temperature in the passenger compartment may rapidly lowers if, for example, an outside air temperature is low, and the passengers in the passenger compartment may feel uncomfortable before the engine is restarted and the heating is resumed.

However, if the stop duration of the engine is set to be shorter so as to prevent the aforesaid inconvenience, then it would be undesirably less effective in restraining fuel consumption while idling.

SUMMARY OF THE INVENTION

An object of the present invention is to provide a controller for a vehicle capable of reducing fuel consumption in addition to restraining a rise in temperature or a fall in temperature in the passenger compartment when carrying out control to temporarily stop an engine while the vehicle is at rest.

The present invention has been made to fulfill the aforesaid object, and a first aspect of the present invention relates to a controller for a vehicle equipped with an engine, a blower fan which supplies air from outside into a passenger compartment or circulates air in the passenger compartment, a refrigerant circulation passage, a compressor which is connected to the refrigerant circulation passage and driven by the engine, and an evaporator which is connected to the refrigerant circulation passage and which is provided in a circulation passage of air blown into the passenger compartment by the blower fan, and which air-conditions the passenger compartment by operating the compressor and the blower fan. The controller for a vehicle includes an engine controller which stops the engine if a predetermined stop condition holds and which restarts the engine thereafter when a predetermined engine stop duration has elapsed.

The controller for a vehicle further includes a supplied air temperature detector which detects the temperature of the air supplied to the evaporator by operating the blower fan, an evaporator temperature detector which detects the temperature of the evaporator, and an engine stop duration determiner which determines the engine stop duration on the basis of the temperature detected by the evaporator temperature detector and the temperature detected by the supplied air temperature detector immediately before the engine is stopped. The engine controller continues the operation of the blower fan while the engine is at rest after the stop condition holds and the engine is stopped, then restarts the engine to actuate the compressor when the engine stop duration has elapsed.

With this arrangement, if the stop condition holds and the engine stops with the compressor being in operation or if the engine stops relatively soon after the operation of the compressor is stopped, the evaporator remains at a low temperature. This makes it possible to obtain a certain level of air conditioning effect by continuing the operation of the blower fan after the engine stop so as to blow air into the passenger compartment through the intermediary of the evaporator. The air conditioning effect reduces as the temperature of the evaporator rises. The temperature rising rate of the evaporator increases as the temperature of the air circulating around the evaporator rises.

Hence, the engine stop duration determiner determines the engine stop duration on the basis of the temperature detected by the evaporator temperature detector and the temperature detected by the supplied air temperature detector immediately before an engine stop. This makes it possible to determine the engine stop duration by reflecting the degree of the continued air conditioning effect provided by the evaporator while the engine is at rest, thus allowing the fuel consumption of the engine to be reduced in addition to restraining a rise in the temperature in the passenger compartment while the engine is at the rest.

In the present invention, immediately before the engine stop, there is an extremely small (ignorable) difference between the temperature detected by the evaporator temperature detector immediately before the engine stop and the temperature detected by the evaporator temperature detector at the point when the engine was stopped. When the engine is stopped, the temperature of the evaporator rapidly rises because the compressor stops and the circulation of the refrigerant stops accordingly, so that it is difficult to stably detect the temperature of the evaporator by the evaporator temperature detector at the engine stop. Therefore, using the temperature detected immediately before the engine stop by the evaporator temperature detector makes it possible to stably detect or estimate the temperature of the evaporator at the engine stop, allowing the engine stop duration to be determined.

The controller for a vehicle further includes a vehicle condition detector which detects the condition under which the vehicle is being placed, and a permissible upper limit temperature determiner which determines a permissible upper limit temperature of the evaporator on the basis of a target temperature of airblow into the passenger compartment under a condition detected by the vehicle condition detector, wherein the engine stop duration determiner sets a longer engine stop duration as the temperature difference between the temperature detected by the evaporator temperature detector immediately before the engine stop and the permissible upper limit temperature increases.

In the present invention, the temperature difference between the temperature detected by the evaporator temperature detector and the permissible upper limit temperature based on the aforesaid target airblow temperature indicates the degree of allowance of a temperature rise in the passenger compartment with respect to the target airblow temperature at an engine stop. Hence, determining a longer engine stop duration by the engine stop duration determiner as the temperature difference increases makes it possible to reduce the fuel consumption of the engine in addition to limiting a temperature rise in the passenger compartment while the engine is at rest to the vicinity of the target airblow temperature.

The engine stop duration determiner determines a shorter engine stop duration as the amount of air blown into the passenger compartment by the blower fan increases.

With this arrangement, as the volume of air blown out into the passenger compartment by the blower fan increases, the flow rate of the air supplied to the evaporator increases, causing the rising rate of the temperature of the evaporator to increase. Thus, determining a shorter engine stop duration by the engine stop duration determiner as the amount of the air blown out into the passenger compartment increases makes it possible to enhance the effect for reducing fuel consumption in addition to restraining a rise in the temperature in the passenger compartment while the engine is at rest.

Further, the engine stop duration determiner sets a longer engine stop duration when the air in the passenger compartment is supplied to the evaporator by the blower fan while the engine is at rest than when the air outside the vehicle is supplied to the evaporator by the blower fan.

In the present invention, if the passenger compartment has been air conditioned by operating the compressor, then the outside air temperature is considered to be higher than the temperature in the passenger compartment. For this reason, the rising rate of the temperature of the evaporator is higher in the case where the air outside the vehicle is supplied to the evaporator by the blower fan than the case where the air inside the vehicle is supplied to the evaporator by the blower fan.

Hence, the engine stop duration determiner determines a longer engine stop duration when the air in the passenger compartment is supplied to the evaporator by the blower fan than when the air outside the vehicle is supplied to the evaporator by the blower fan. With this arrangement, the effect for reducing fuel consumption can be enhanced while restraining a rise in the temperature in the passenger compartment when the engine is at rest.

Further, the controller for a vehicle includes a fogging determination humidity estimator which estimates a fogging determination humidity, which is a humidity not causing window glass of the vehicle to fog up under the condition detected by the vehicle condition detector, a humidity detector which detects the humidity in the passenger compartment, and an estimated fogging start time determiner which determines a longer estimated fogging start time, which is an estimated time when the fogging of the window glass occurs after the engine is stopped, as the humidity difference between the humidity detected by the humidity detector immediately before an engine stop and the fogging determination humidity increases, wherein, in the case where the estimated fogging start time is reached before the engine stop duration elapses following an engine stop after the stop condition holds, the engine controller restarts the engine and actuates the compressor when the estimated fogging start time is reached.

With this arrangement, the fogging determination humidity estimator estimates the fogging determination humidity, which is the humidity not causing window glass to fog under the condition detected by the vehicle condition detector. Then, the estimated fogging start time determiner determines a longer estimated fogging start time as the humidity difference between the humidity detected by the humidity detector immediately before an engine stop and the fogging determination humidity increases Thus, by determining a longer estimated fogging start time as the humidity difference between the fogging determination humidity estimated on the basis of the condition under which the vehicle is being placed and the humidity detected by the humidity detector immediately before the engine stop increases, the estimated fogging start time can be determined, considering the factors contributing to the fogging of the window glass of the vehicle.

Further, if the estimated fogging start time is reached before the engine stop duration elapses following an engine stop after the stop condition holds, then the engine controller restarts the engine and actuates the compressor when the estimated fogging start time is reached. This makes it possible to restrain the window glass from fogging while the engine is at rest.

A second to a fourth aspects of the present invention relate to a controller for a vehicle equipped with an engine controller, which stops an engine when a predetermined stop condition holds and then restarts the engine when a predetermined engine stop duration elapses, in a vehicle having an engine, a blower fan which supplies air from outside into a passenger compartment or circulates air in the passenger compartment, a pump driven by the engine to circulate a coolant to a radiator of the engine through the intermediary of a coolant circulation passage, and a heat exchanger which is in communication with the coolant circulation passage and which is provided in a circulation passage of air sent into the passenger compartment by the blower fan to heat ambient air by the heat radiation from the coolant circulating in the coolant circulation passage.

The controller for a vehicle according to a second aspect of the present invention is equipped with a sent-out air temperature detector which detects the temperature of air sent out to the heat exchanger from the blower fan, and an engine stop duration determiner which determines a longer engine stop duration as the temperature detected by the sent-out air temperature detector increases, wherein the engine controller continues operating the blower fan while the engine is at rest following an engine stop after the stop condition holds, then restarts the engine to actuate the pump when the engine stop duration has elapsed.

In such an arrangement, when the engine is running, the coolant which has been heated by the radiator is sent out to the heat exchanger by the pump, and when the engine stops and the pump stops accordingly, the coolant which has been heated by the radiator remains in the heat exchanger. Therefore, even after the engine stops, the effect for heating the air blown out into the passenger compartment through the intermediary of the heat exchanger can be obtained by operating the blower fan until the temperature of the heat exchanger falls down to a certain level. The effect gradually deteriorates as the temperature of the heat exchanger falls; however, the falling rate of the temperature of the heat exchanger increases as the temperature of the air sent out toward the heat exchanger from the blower fan decreases.

Hence, the engine stop duration determiner determines a longer engine stop duration as the temperature of air sent out toward the heat exchanger from the blower fan detected by the sent-out air temperature detector increases, and the engine control unit continues the operation of the blower fan while the engine is at rest and restarts the engine to actuate the pump when the engine stop duration has elapsed, thereby allowing the fuel consumption of the engine to be reduced while restraining a fall in the temperature in the passenger compartment at the same time when the engine is at rest.

The controller for a vehicle according to the third aspect is equipped with an airblow amount changing means which changes the amount of airblow into the passenger compartment supplied from the blower fan, and an engine stop duration determiner which determines a shorter engine stop duration as the amount of airblow into the passenger compartment supplied from the blower fan increases, wherein the engine controller continues operating the blower fan while the engine is at rest following an engine stop after the stop condition holds, then restarts the engine and actuates the pump when the engine stop duration has elapsed.

With this arrangement, as the volume of air blown out into the passenger compartment by the blower fan increases, the flow rate of air circulating around the heat exchanger increases, thus leading to a higher falling rate of the temperature of the heat exchanger while the engine is at rest. Hence, the effect for heating the air by the heat exchanger quickly deteriorates.

As a solution to the aforesaid problem, the engine stop duration determiner sets a shorter engine stop duration as the volume of air blown out into the passenger compartment by the blower fan increases, and the engine controller continues the operation of the blower fan while the engine is at rest and restarts the engine to actuate the pump when the engine stop duration has elapsed. This makes it possible to reduce the fuel consumption and also to restrict the fall in the temperature in the passenger compartment when the engine is at rest.

Further, in the second aspect and the third aspect, the vehicle has a compressor which is connected to a refrigerant circulation passage and driven by the engine, and an evaporator which is connected to the refrigerant circulation passage and which is provided in a circulation passage of air blown into the passenger compartment by the blower fan, and the controller for a vehicle includes a vehicle condition detector which detects a condition under which the vehicle is being placed, a fogging determination humidity estimator which estimates a fogging determination humidity, which is a humidity not causing window glass of the vehicle to fog up under the condition detected by the vehicle condition detector, a humidity detector which detects the humidity in the passenger compartment, and an estimated fogging start time determiner which determines a longer estimated fogging start time, which is an estimated time when the fogging of the window glass occurs following an engine stop, as the humidity difference between the humidity detected by the humidity detector immediately before the engine stop and the fogging determination humidity increases, wherein if the estimated fogging start time is reached before the engine stop duration elapses following an engine stop after the stop condition holds, the engine controller restarts the engine and actuates the compressor when the estimated fogging start time is reached.

With this arrangement, the fogging determination humidity estimator estimates the fogging determination humidity, which is the humidity not causing the window glass to fog under the condition detected by the vehicle condition detector. The estimated fogging start time determiner determines a longer estimated fogging start time as the humidity difference between the humidity detected by the humidity detector immediately before the engine stop and the fogging determination humidity increases.

Thus, by determining a longer estimated fogging start time as the humidity difference between the fogging determination humidity estimated on the basis of the condition under which the vehicle is being placed and the humidity detected by the humidity detector immediately before the engine stop increases, the estimated fogging start time can be determined by considering factors contributing to the fogging of the window glass of the vehicle.

Further, if the estimated fogging start time is reached before the engine stop duration elapses following an engine stop after the stop condition holds, then the engine controller restarts the engine and actuates the compressor when the estimated fogging start time is reached. This makes it possible to restrain the window glass from fogging while the engine is at rest.

The fourth aspect of the present invention relates to a controller for a vehicle which is equipped with an engine controller which stops an engine when a predetermined stop condition holds and then restarts the engine when a predetermined engine stop duration has elapsed in a vehicle having a compressor which is connected to a refrigerant circulation passage and driven by the engine, and an evaporator which is connected to the refrigerant circulation passage and which is provided in a circulation passage of air blown into the passenger compartment by the flower fan, and an air mixing ratio changer which changes an air mixing ratio, which is the mixing proportion of the air blown out into the passenger compartment through the intermediary of the evaporator with respect to the air blown out into the passenger compartment through the intermediary of the heat exchanger.

The controller for a vehicle according to the fourth aspect also includes an engine stop duration determiner which determines a longer engine stop duration for a lower air mixing ratio.

In this arrangement, as the air mixing ratio decreases, the air blown out into the passenger compartment through the intermediary of the heat exchanger will be less cooled by being mixed with the air blown out into the passenger compartment through the intermediary of the evaporator, resulting in a lower falling rate of the temperature in the passenger compartment during an engine stop.

Therefore, the engine stop duration determiner determines a longer engine stop duration for a lower air mixing ratio, and the engine controller continues the operation of the blower fan during an engine stop and then restarts the engine to actuate the pump when the engine stop duration has elapsed. This makes it possible to reduce the fuel consumption of the engine while restricting a fall in the temperature in the passenger compartment during an engine stop.

The controller for a vehicle according to the fourth aspect of the invention is further equipped with a vehicle condition detector which detects a condition under which the vehicle is being placed, a fogging determination humidity estimator which estimates a fogging determination humidity, which is a humidity not causing window glass of the vehicle to fog up, under the condition detected by the vehicle condition detector, a humidity detector which detects the humidity in the passenger compartment, and an estimated fogging start time determiner which determines a longer estimated fogging start time, which is an estimated time when the fogging of the window glass occurs following an engine stop, as the humidity difference between the humidity detected by the humidity detector immediately before the engine stop and the fogging determination humidity increases, wherein if the estimated fogging start time is reached before the engine stop duration elapses following an engine stop after the stop condition holds, the engine controller restarts the engine and actuates the compressor when the estimated fogging start time is reached.

With this arrangement, the fogging determination humidity estimator estimates the fogging determination humidity, which is a humidity not causing window glass of the vehicle to fog up under the condition detected by the vehicle condition detector. The estimated fogging start time determiner determines a longer estimated fogging start time as the humidity difference between the humidity detected by the humidity detector immediately before the engine stop and the fogging determination humidity increases.

Thus, by determining a longer estimated fogging start time as the humidity difference between the fogging determination humidity estimated on the basis of the condition under which the vehicle is being placed and the humidity detected by the humidity detector immediately before the engine stop increases, the estimated fogging start time can be determined by considering factors contributing to the fogging of the window glass of the vehicle.

Further, if the estimated fogging start time is reached before the engine stop duration elapses following an engine stop after the stop condition holds, then the engine controller restarts the engine and actuates the compressor when the estimated fogging start time is reached. This makes it possible to restrain the window glass from fogging while the engine is at rest.

DESCRIPTION OF THE PREFERRED EMBODIMENTS

The following will describe the embodiments of the present invention with reference to FIG. 1 to FIG. 7.

Figure 1:
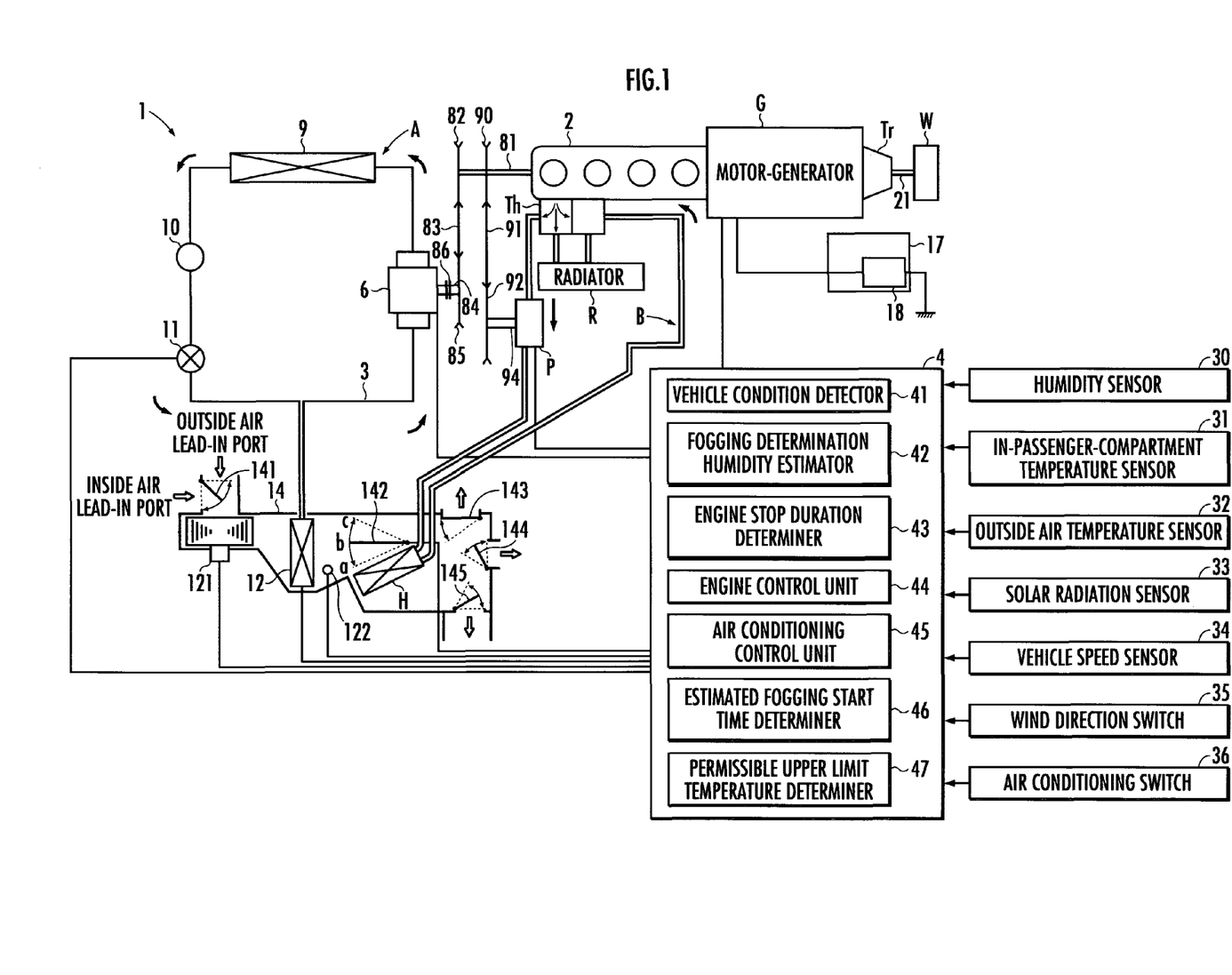
FIG. 1 is a block diagram of a vehicle provided with the controller for a vehicle in accordance with the present invention.

FIG. 1 is a block diagram of a vehicle equipped with the controller for a vehicle in accordance with the present invention. The vehicle of the present embodiment is a hybrid vehicle having an engine 2 and a motor-generator G as the drive sources thereof. The vehicle of the present embodiment is further equipped with an engine stop/restart feature for stopping the engine 2 if a stop condition holds and for restarting the engine 2 if a start condition holds thereby to reduce the amount of emission gases and to restrain fuel consumption when the vehicle stops at a traffic signal or in a traffic jam or the like.

The vehicle of the present embodiment is further equipped with an air conditioner 1 which heats/cools the passenger compartment. The air conditioner 1 has a cooling function and a dehumidifying function performed by a refrigeration cycle unit A and a heating function by a heater core H (corresponding to the heat exchanger in the present invention) provided in a circulation passage B of a coolant of the engine 2.

A controller 4, which is an electronic unit constructed mainly of a microcomputer (corresponding to the controller for a vehicle in the present invention), controls the operations of the engine 2, the motor-generator G, and the air conditioner 1. The controller 4 functions as a vehicle condition detector 41, a fogging determination humidity estimator 42, an engine stop duration determiner 43, an engine control unit 44, an air conditioning control unit 45, an estimated fogging start time determiner 46, and a permissible upper limit temperature determiner 47 by running a predetermined program.

The controller 4 receives detection signals from a humidity sensor 30 (corresponding to the humidify detecting means in the present invention) which detects the humidity in a passenger compartment, an in-passenger-compartment temperature sensor 31 which detects the temperature in the passenger compartment, an outside air temperature sensor 32 which detects the temperature outside the vehicle, a solar radiation sensor 33 which detects the amount of solar radiation, a vehicle speed sensor 34 which detects a vehicle speed, and an evaporator temperature sensor 122 (corresponding to the evaporator temperature detecting means in the present invention) which detects the temperature in the vicinity of the downstream side of the evaporator 12, which will be discussed later. The controller 4 also receives operational signals of a wind direction switch 35 for setting the direction of conditioned air into the passenger compartment, and an air conditioning switch 36 for setting the conditions of air conditioning, such as a temperature and an air volume.

The controller 4 issues control signals to control the operations of the engine 2, the motor-generator G, the air conditioner 1, and the like.

The air conditioner 1 is provided with a compressor 6 driven by the engine 2, a condenser 9, a receiver 10, an expansion valve 11, and the evaporator 12, which constitute the refrigeration cycle unit A. The air conditioner 1 is also provided with a heater core H constituting a coolant circulation passage B of the engine 2, a water pump P driven by the engine 2, a thermostat Th, and a radiator R to perform heating.

The engine 2 and the motor-generator G are directly connected by a rotating shaft 21, thus making possible to generate a driving force by the engine 2 and the motor-generator G and to generate a regenerative electric power by the motor-generator G at the time of deceleration. The revolutions of the engine 2 and the motor-generator G are transmitted to wheels W through the intermediary of a transmission Tr.

Further, the motor-generator G has a function as a starter motor for starting up the engine 2. The regenerative electric power of the motor-generator G charges a battery 18 of an electrical storage unit 17.

The refrigeration cycle unit A is constructed by connecting the compressor 6, the condenser 9, the receiver 10, the expansion valve 11, and the evaporator 12 in this order to a refrigerant circulation passage 3, the compressor 6 being located on the upstream side, while the evaporator 12 being located on the downstream side. The refrigeration cycle evaporates, compresses, condenses, and expands a refrigerant composed of chlorofluorocarbon or carbon dioxide or the like.

The air conditioning control unit 45 of the controller 4 calculates a target evaporator temperature on the basis of mainly the temperature set by means of the air conditioning switch 36, an outside air temperature, humidity, and the amount of solar radiation, and controls the compressor 6 such that the difference between the target evaporator temperature and the temperature detected by the evaporator temperature sensor 122 is reduced. The compressor 6 is operated by the driving force of the engine 2. The driving force of the engine is transmitted to the compressor 6 through the intermediary of a pulley 82 provided on the distal end of a rotating shaft 81 of the engine 2, a pulley 85 provided on a drive shaft 84 of the compressor 6 and a belt 83 which interlocks the pulleys 82 and 85.

The drive shaft 84 of the compressor 6 is provided with an electromagnetic clutch 86, and the air conditioning control unit 45 switches between the transmission and the cutoff of the driving force of the engine 2 to the compressor 6 by the electromagnetic clutch 86.

The condenser 9 cools and liquefies, by heat exchange, a refrigerant which has come to carry high temperature and high pressure by having been compressed by the compressor 6. The receiver 10, which is a cylinder for temporarily storing the refrigerant liquefied by the condenser 9, is connected to the expansion valve 11 through the intermediary of a drier (not shown). The refrigerant whose moisture has been removed by the drier is supplied to the expansion valve 11.

When the liquefied refrigerant having high temperature and high pressure passes through the expansion valve 11, which is installed at the inlet side of the evaporator 12, the expansion valve 11 changes the refrigerant from the liquefied state into a misty gas and then injects the misty gas. The expansion valve 11 incorporates a throttle valve (not shown). The air conditioning control unit 45 controls the opening of the throttle valve thereby to adjust the flow rate of the refrigerant (the refrigerant capacity) to be injected into the evaporator 12.

The evaporator 12 is a heat exchanger which takes heat from the air inside the vehicle by vaporizing the refrigerant thereby to cool the passenger compartment. The evaporator 12 is accommodated in an air conditioning case 14. A blower fan 121 is provided on the upstream side of the evaporator 12. The number of revolutions of the blower fan 121 is controlled by the air conditioning control unit 45.

As the blower fan 121 rotates, the air which has been dehumidified and cooled by the evaporator 12 or the air which has been heated by the heater core H is blown into the passenger compartment, and the air in the passenger compartment or outside air is supplied into the air conditioning case 14. The air is sent out into the passenger compartment through the intermediary of a deaf door 143, a vent door 144, and a floor door 145.

The construction of the heating system will now be described. The coolant of the engine 2 is supplied from the thermostat Th to the radiator R by the mechanical water pump P operated by the driving force of the engine 2, and the coolant circulates in a water jacket of the engine 2. Further, the coolant of the engine 2 is branched to be used as a heating source for heating the passenger compartment. The coolant circulates in the circulation passage B from the water pump P via the heater core H and back to the water pump P.

The driving force of the engine 2 is transmitted to the water pump P through the intermediary of a pulley 90 provided on the rotating shaft 81 of the engine 2, a pulley 92 provided on a drive shaft 94 of the water pump P, and a belt 91 which interlocks the pulleys 90 and 92.

The heater core H is adapted to perform heat exchange for heating ambient air by the heat from the coolant which has been heated by the engine 2 in the radiator R. On the upstream side of the heater core H, an air mixing door 142 is installed. The air mixing door 142 leads the air which has passed through the evaporator 12 to the heater core H or makes the air bypass the heater core H.

The air mixing door 142 is formed of, for example, a rotary plate door which opens and closes the air inlet of the heater core H. The air mixing door 142 is opened and closed by an air mixing servomotor (not shown) installed adjacently to the rotational center.

The air mixing door 142 is set such that the air in the air conditioning case 14 is prevented from flowing to the heater core H at a closed position "a," the half of the air in the air conditioning case 14 flows to the heater core H at a middle position "b" and all the air in the air conditioning case 14 flows to the heater core H at a release position "c." The air conditioning control unit 45 operates the air mixing servomotor (not shown) to change the position of the air mixing door 142, thereby controlling the temperature of the air to be blown into the passenger compartment.

In the air conditioning case 14, an intake door 141 which switches between an inside air lead-in port and an outside air lead-in port is installed on the upstream side, and the deaf door 143 for discharging the air which has been dehumidified and cooled by the evaporator 12 or the air which has been heated by the heater core H to a defroster, the vent door 144 for discharging the air to a ventilator, and the floor door 145 for discharging the air toward feet are installed on the downstream side.

The intake door 141, the deaf door 143, the vent door 144, and the floor door 145 may be electrically moved by servomotors or moved manually.

Referring now to the flowcharts given in FIG. 2 and FIG. 3, a first embodiment of the processing for stopping/restarting the engine 2 by the engine control unit 44 will be described.

[First Embodiment]

Figure 2:
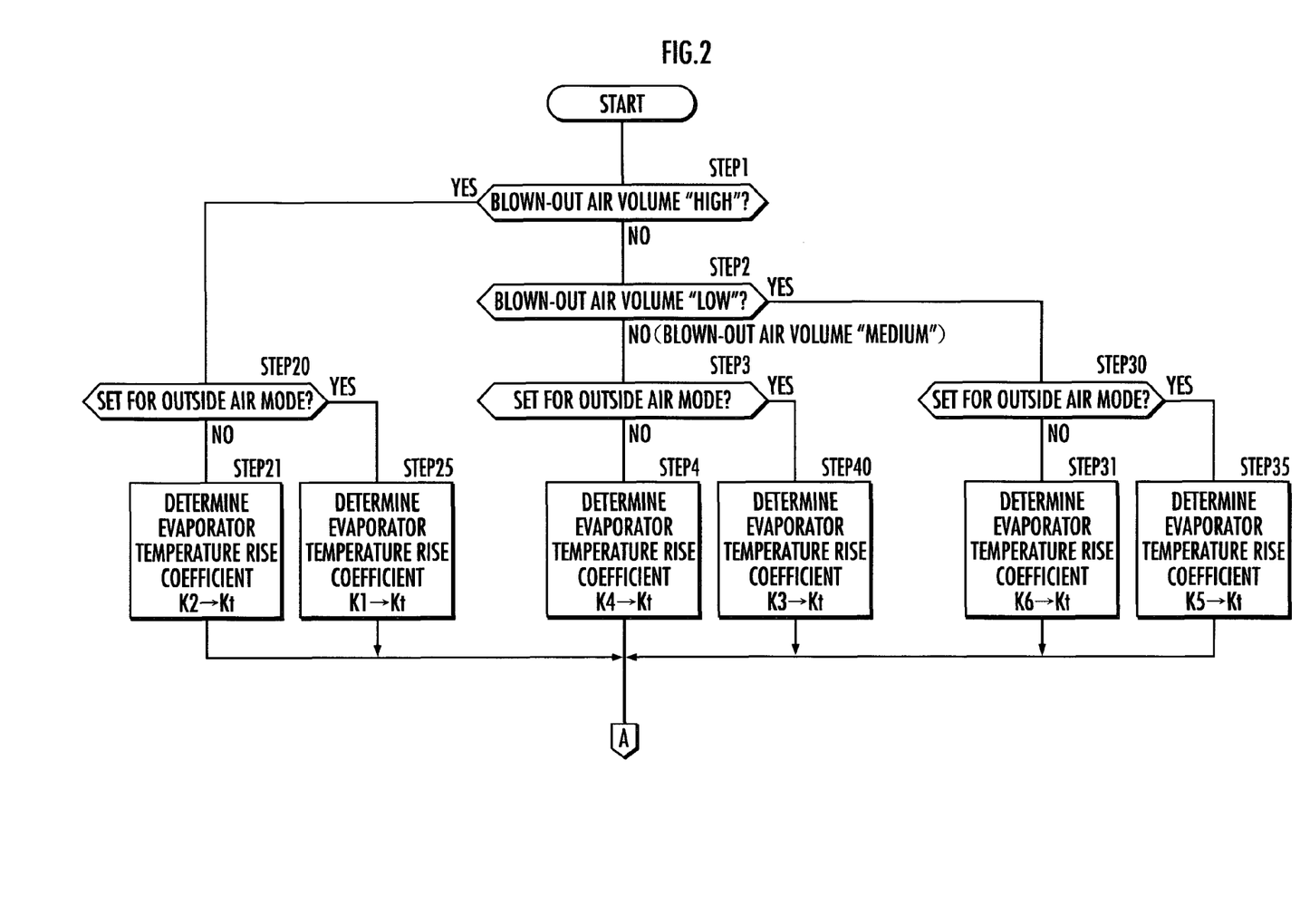
FIG. 2 is a flowchart for determining a temperature rise coefficient of an evaporator in a first embodiment.
Figure 3:
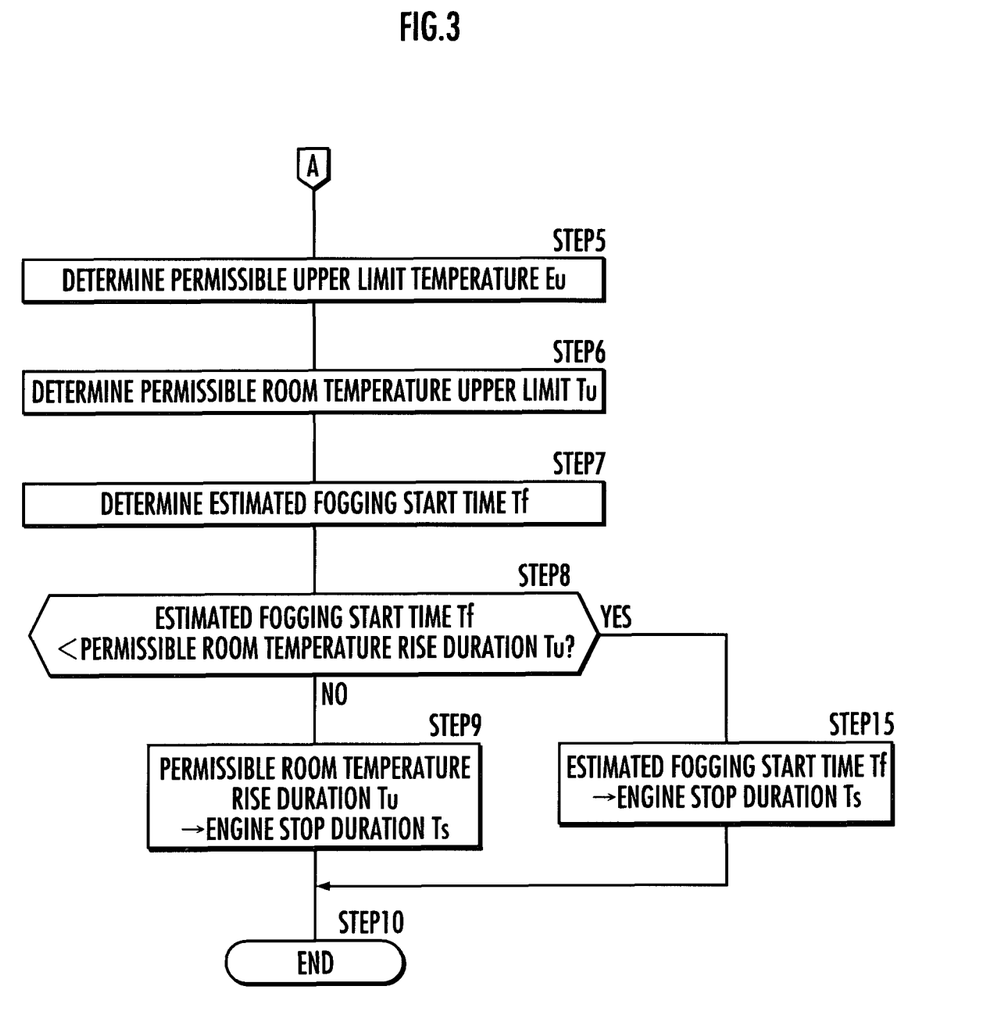
FIG. 3 is a flowchart for determining an engine stop duration in the first embodiment.

An engine stop duration determiner 43 repeatedly runs the processing illustrated by the flowcharts of FIG. 2 and FIG. 3 while an engine 2 is running so as to determine and update an engine stop duration Ts to be a longest possible duration within a temperature rise range which allows the comfortableness in the passenger compartment to be maintained.

In STEP1 of FIG. 2, the engine stop duration determiner 43 determines whether the volume of air blown out into the passenger compartment by a blower fan 121 has been set to "High" by an air conditioning switch 36. If the volume of air blown out has been set to "High," then the processing branches off to STEP20, or if it has not been set to "High," then the processing proceeds to STEP2.

In STEP2, the engine stop duration determiner 43 determines whether the volume of air blown out into the passenger compartment by a blower fan 121 has been set to "Low." The processing branches off to STEP30 if the volume of air blown out has been set to "Low," or proceeds to STEP3 if it has not been set to "Low."

In STEP3, if it is found that an outside air mode (a mode in which an intake door 141 causes outside air to be led to the blower fan 121 through an outside air lead-in port) has been set by the air conditioning switch 36, then the processing branches off to STEP40. In STEP40, the engine stop duration determiner 43 sets a temperature rise coefficient Kt of an evaporator 12 to K3 and proceeds to STEP5 in FIG. 3.

Meanwhile, if it is found that an inside air mode (a mode in which the intake door 141 causes the air inside the vehicle to be led to the blower fan 121 through an inside air lead-in port) has been set by the air conditioning switch 36, then the processing proceeds to STEP4. The engine stop duration determiner 43 sets the temperature rise coefficient Kt of the evaporator 12 to K4 and proceeds to STEP5 in FIG. 3.

Here, the outside air mode means that outside air of a higher temperature than that of the air inside the vehicle is supplied to the evaporator 12, so that the temperature rising rate of the evaporator 12 will be higher than that in the inside air mode. For this reason, the temperature rise coefficients are set to K3<K4.

In STEP20, if it is determined that the outside air mode has been set by the air conditioning switch 36, then the processing branches off to STEP25. In STEP25, an engine stop duration determiner 43 sets the temperature rise coefficient Kt of the evaporator 12 to K1 and proceeds to STEP3 in FIG. 3. Meanwhile, if it is determined in STEP20 that the inside air mode has been set by the air conditioning switch 36, then the processing proceeds to STEP21.

Subsequently, the engine stop duration determiner 43 sets the temperature rise coefficient Kt of the evaporator 12 to K2 and proceeds to STEP5 in FIG. 3. In this case also, K1 for the outside air mode is set to be larger than K2 for the inside air mode (K2<K1).

If it is determined in STEP30 that the outside air mode has been set by the air conditioning switch 36, the processing branches off to STEP35. Then, in STEP35, the engine stop duration determiner 43 sets the temperature rise coefficient Kt to K5 and proceeds to STEP5 in FIG. 3. Meanwhile, if it is determined in STEP30 that the inside air mode has been set by the air conditioning switch 36, then the processing proceeds to STEP31. The engine stop duration determiner 43 sets the temperature rise coefficient Kt of the evaporator 12 to K5 and proceeds to STEP5 in FIG. 3.

Here, the flow rate of the air supplied to the evaporator 12 increased as the volume of the air blown out into the passenger compartment increases, resulting in a higher temperature rise rate of the evaporator 12. Thus, the aforesaid K1 to K5 are set such that K3 and K4 for a medium blown-out air volume are higher than K5 and K6 for a low blown-out air volume, and K1 and K2 for a high blown-out air volume are even higher, as indicated by expression (1) given below.

$$K6<K5<K4<K3<K2<K1 \quad (1)$$

The processing in STEP5 of FIG. 3 is carried out by a permissible upper limit temperature determiner 47. The permissible upper limit temperature determiner 47 determines a permissible upper limit temperature Eu of the evaporator 12, from a target airblow temperature determined by an air conditioning control unit 45, on the basis of the condition under which the vehicle is being placed detected by a vehicle condition detector 41 and the temperature set by the air conditioning switch 36.

Here, the vehicle condition detector 41 detects the condition under which the vehicle is being placed from three factors, namely, the amount of solar radiation detected by a solar radiation sensor 33, the temperature in the passenger compartment detected by an in-passenger-compartment temperature sensor 31, and the outside air temperature detected by an outside air temperature sensor 32. The air conditioning control unit 45 sets a higher target airblow temperature than a set temperature if, for example, the outside air temperature is relatively high, according to the condition under which the vehicle is being placed.

In this case, the outside air temperature sensor 32 and the in-passenger-compartment temperature sensor 31 correspond to the supplied air temperature detecting means in the present invention. When outside air is supplied to the evaporator 12, the temperature of the air supplied to the evaporator 12 is detected by the outside air temperature sensor 32. When the air in the passenger compartment is supplied to the evaporator 12, the temperature of the air supplied to the evaporator 12 is detected by the in-passenger-compartment temperature sensor 31.

The permissible upper limit temperature determiner 47 determines the permissible upper limit temperature Eu by referring the target airblow temperature determined by the air conditioning control unit 45 to a correlation map, which indicates the correlation between the target airblow temperatures and the permissible upper limit temperatures of the evaporator 12. The correlation map is prepared beforehand by experiments or computer simulation, and the data of the correlation map is stored in a memory (not shown) of the controller 4.

In the subsequent STEP5, the engine stop duration determiner 43 uses expression (2) given below to determine a permissible room temperature rise duration Tu, which is the stop duration of the engine 2 within the temperature rise range which allows the comfortableness to be maintained in the passenger compartment.

$$Tu=1/Kt \cdot (Eu-Es) \quad (2)$$

where Tu: Permissible room temperature rise duration; Kt: Temperature rise coefficient of the evaporator 12 after an engine stop; Eu: Permissible upper limit temperature of the evaporator 12; and Es: Temperature of the evaporator 12 detected immediately before an engine stop.

In the subsequent STEP6, an estimated fogging start time determiner 46 determines an estimated fogging start time Tf, which is the estimated time when the window glass of the vehicle starts to fog following a stop of the engine 2, according to expression (3) given below.

$$Tf=1/Kf \cdot (Hd-Hs) \quad (3)$$

where Tf: Estimated fogging start time; Kf: Humidity rise coefficient in the passenger compartment; Hd: Fogging determination humidity; and Hs: Humidity detected in the passenger compartment immediately before an engine stop.

Here, the fogging determination humidity estimator 42 estimates, as the fogging determination humidity Hd, a value in the vicinity of a lower limit value of the humidity not causing fogging under the condition in which the vehicle is being placed detected by the vehicle condition detector 41. The fogging determination humidity estimator 42 obtains the fogging determination humidity Hd by applying the condition under which the vehicle is being placed detected by the vehicle condition detector 41 to the map indicating the correlation between the conditions under which the vehicle is being placed detected by the vehicle condition detector 41 and the fogging determination humidity.

When the fogging determination humidity estimator 42 estimates the fogging determination humidity Hd, the vehicle condition detector 41 detects the condition under which the vehicle is being placed on the basis of the temperature in the passenger compartment detected by the in-passenger-compartment temperature sensor 31, the outside air temperature detected by the outside air temperature sensor 32, the amount of solar radiation detected by the solar radiation sensor 33, the vehicle speed immediately before the vehicle stops detected by the vehicle speed sensor 34, the direction of air sent into the passenger compartment by the blower fan 121 set by a wind direction switch 35, the air conditioning condition set by the air conditioning switch 36, and the like.

The map indicating the correlation between the conditions under which the vehicle is being placed detected by the vehicle condition detector 41 and the fogging determination humidity is prepared by experiments, computer simulation, or the like, and the data of the map is stored beforehand in a memory (not shown). Instead of using a map, an expression of the correlation between the conditions under which the vehicle is being placed and the fogging determination humidity Hd may be used to obtain the fogging determination humidity Hd.

The estimated fogging start time determiner 46 sets the humidity rise coefficient Kf in the above expression (3) to (a) Ka when the engine 2 is stopped with a refrigeration cycle unit A and the blower fan 121 in operation and the operation of the blower fan 121 is continued after the engine 2 is stopped, or (b) Kb (>Ka) when the engine 2 is stopped with the refrigeration cycle unit A stopped while the blower fan 121 in operation and the operation of the blower fan 121 is continued after the engine 2 is stopped, or (c) Kc (>Kb) when the engine 2 is stopped with the blower fan 121 stopped, and the blower fan 121 remains at rest after the engine 2 is stopped.

Further, if the refrigeration cycle unit A and the blower fan 121 have been in operation until the engine 2 is stopped, the evaporator 12 has been cooled. Therefore, even if the refrigeration cycle unit A stops as the engine 2 stops, the air supplied to the evaporator 12 will be dehumidified to a certain degree as long as the blower fan 121 is in operation.

If the blower fan 121 is in operation while the engine 2 is at rest, the circulation of air in the passenger compartment retards the fogging of the window glass to a certain degree. Hence, changing the humidity rise coefficient Kf as indicated by expression (4) shown below according to the aforesaid three conditions (a) to (c) makes it possible to accurately determine the estimated fogging start time Tf on the basis of factors contributing to the fogging of the window glass.

$$Ka < Kb < Kc \quad (4)$$

In the present embodiment, the humidity rise coefficient Kf has been set in three different levels, namely, Ka, Kb and kc, according to the aforesaid conditions (a) to (c). Alternatively, however, the humidity rise coefficient Kf may be set in further detailed levels, including, for example, the air volume, the wind direction, and the like of the blower fan 121.

In the subsequent STEP7, the engine stop duration determiner 43 determines whether an estimated fogging start time Tf is earlier than the end of a permissible room temperature rise duration Tu. If it is determined that the estimated fogging start time Tf is earlier than the end of the permissible room temperature rise duration Tu, then the processing branches off to STEP10, and the engine stop duration determiner 43 determines the estimated fogging start time Tf as the end of the engine stop duration Ts. Then, the processing proceeds to STEP9 to terminate the processing.

Meanwhile, if it is determined in STEP7 that the permissible room temperature rise duration Tu lasts longer than the estimated fogging start time Tf, then the processing proceeds to STEP8. Subsequently, the engine stop duration determiner 43 sets the permissible room temperature rise duration Tu as the engine stop duration Ts.

Thus, fogging of the window glass can be obviated while the engine 2 is at rest by determining the estimated fogging start time Tf as the end of the engine stop duration Ts if the estimated fogging start time Tf is earlier than the end of the permissible room temperature rise duration Tu.

Figure 4:
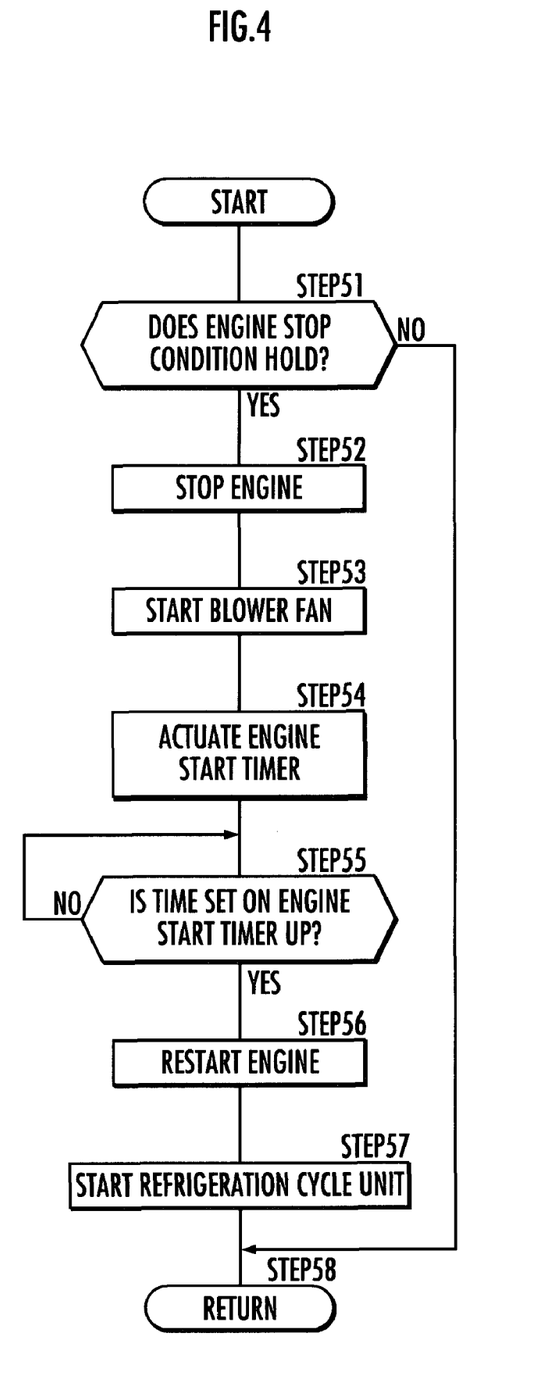
FIG. 4 is a flowchart for temporarily stopping an engine while restricting a temperature rise in a passenger compartment and also restraining window glass from fogging up at the same time in the first embodiment.

Subsequently, the engine control unit 44 carries out the procedure indicated by the flowchart in FIG. 4 to stop and restarts the engine 2.

In STEP51, the engine control unit 44 determines whether the stop condition of the engine 2 holds. Here, regarding the stop condition of the engine 2, the stopping of the engine is enabled if, for example, all of the following three conditions are satisfied: (a) a battery 18 has a sufficient remaining amount of charge, (b) the air conditioner 1 has enabled the stop of the engine 2, and (c) the humidity Hs detected by the humidity sensor 30 is lower than the fogging determination humidity Hd.

If the stop condition of the engine 2 holds in STEP51, then the engine control unit 44 proceeds to STEP52 and stops the engine 2, or if the stop condition of the engine 2 does not hold, then the engine control unit 44 branches off to STEP58 to terminate the processing.

After the engine 2 is stopped in STEP52, the engine control unit 44 proceeds to STEP53 to actuate the blower fan 121 (or continue the operation of the blower fan 121 if the blower fan 121 is already in operation). In STEP54, the engine control unit 44 starts an engine start-up timer which takes the engine stop duration Ts, which has been determined in STEP8 or STEP10 in FIG. 2, as the time to measure. Then, when a predetermined time set on the engine start-up timer has elapsed in the following STEP55, engine control unit 44 proceeds to STEP56 to restart the engine 2.

In the subsequent STEP57, the engine control unit 44 starts up the refrigeration cycle unit A through the intermediary of an air conditioning control unit 45 and proceeds to STEP58 to terminate the processing. The refrigeration cycle unit A is started up to start air conditioning and dehumidifying of the passenger compartment, making it possible to protect the passengers in the passenger compartment from feeling uncomfortable due to a further rise in the temperature in the passenger compartment and also to prevent the window glass from fogging up.

In the present first embodiment, the procedure of STEP6 to STEP8 and STEP10 in FIG. 3 has been carried out to determine the estimated fogging start time Tf, and either the estimated fogging start time Tf or the end of the permissible room temperature rise duration Tu, whichever is earlier, is applied to the engine stop duration Ts. However, the advantages of the present invention can be obtained also when the permissible room temperature rise duration Tu is unconditionally used as the engine stop duration Ts without determining the estimated fogging start time Tf.

In the present first embodiment, the temperature rise coefficient Kt of the evaporator 12 has been set at six different levels, namely, K1 to k6, as illustrated in FIG. 2. Alternatively, however, the temperature rise coefficient Kt of the evaporator 12 may be set at more detailed levels according to, for example, the temperature of the air supplied to the evaporator 12.

Referring now to the flowcharts illustrated in FIG. 5 and FIG. 6, a second embodiment of the processing for stopping and restarting the engine 2 by an engine control unit 44 will be described.

[Second Embodiment]

Figure 5:
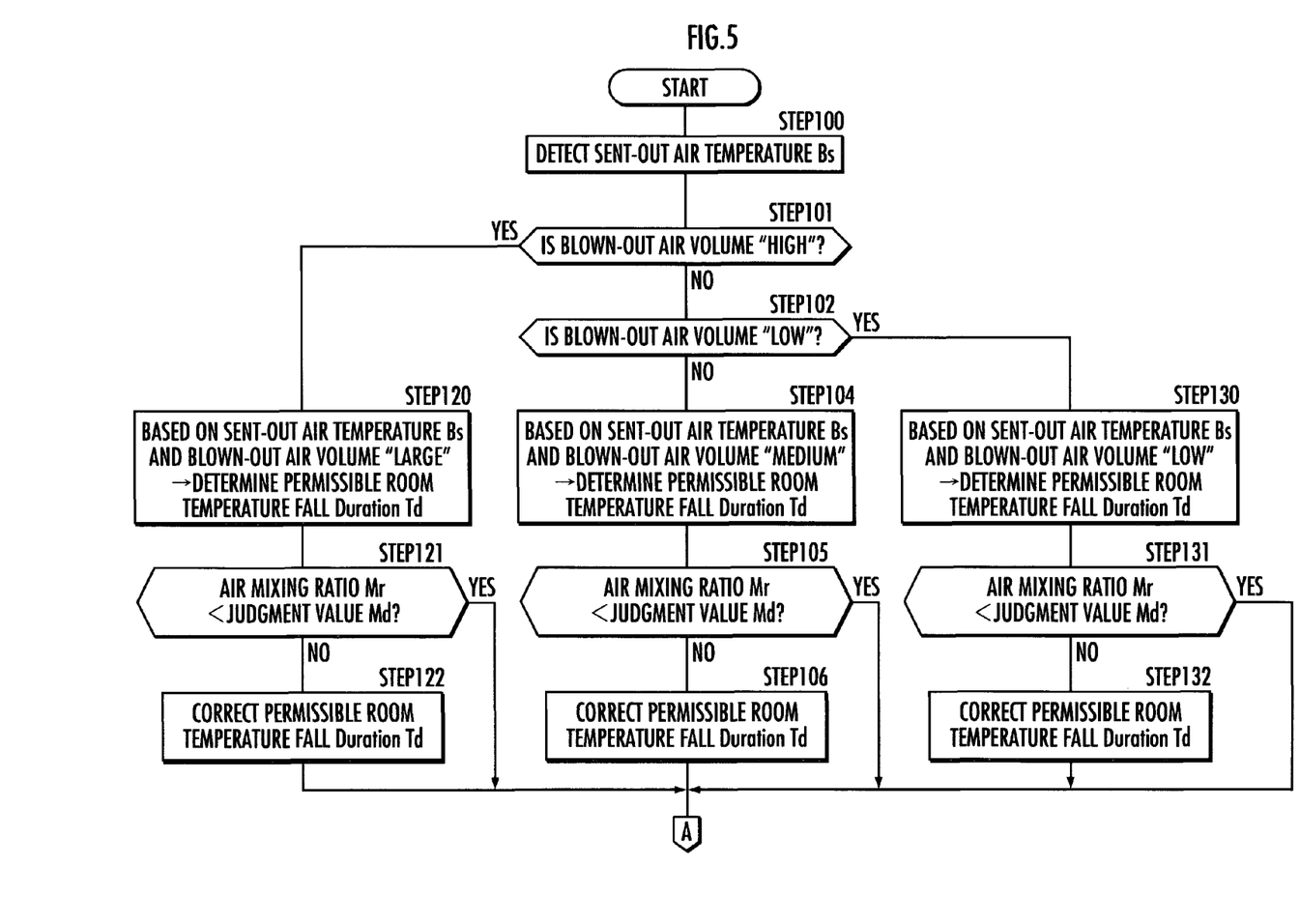
FIG. 5 is a flowchart for determining a permissible room temperature fall time in a second embodiment.
Figure 6:
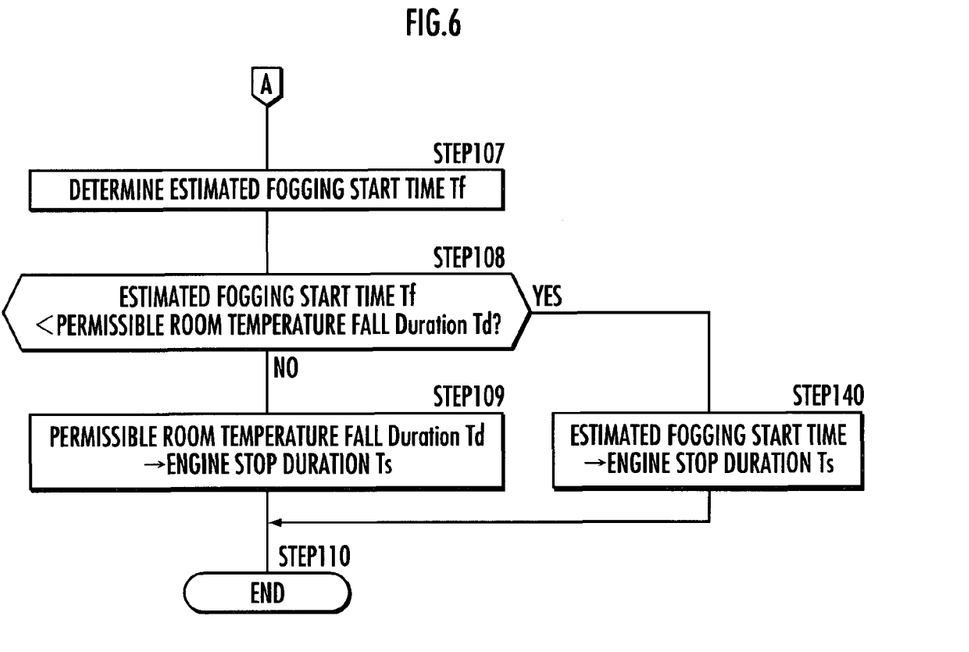
FIG. 6 is a flowchart for determining an engine stop duration in the second embodiment.

An engine stop duration determiner 43 repeatedly runs the processing illustrated by the flowcharts of FIG. 5 and FIG. 6 while an engine 2 is running so as to determine and update an engine stop duration Ts to be a longest possible duration within a temperature fall range which allows the comfortableness in the passenger compartment to be maintained.

In STEP100 of FIG. 5, the engine stop duration determiner 43 detects, by an in-passenger-compartment temperature sensor 31 or an outside air temperature sensor 32, a temperature Bs of the air sent out to a heater core H from a blower fan 121. Here, if an intake door 141 is set for an outside air mode (a mode wherein an outside air lead-in port is open whereas an inside air lead-in port is closed), then the temperature detected by the outside air temperature sensor 32 is the temperature of the air sent out to the heater core H from the blower fan 121.

Further, if the intake door 141 is set for an inside air mode (a mode wherein the outside air lead-in port is closed whereas the inside air lead-in port is open), then the temperature detected by an in-passenger-compartment temperature sensor 31 is the temperature of the air sent out to the heater core H from the blower fan 121. The outside air temperature sensor 32 and the in-vehicle sensor 31 correspond to the sent-out air temperature detecting means in the present invention.

In the subsequent STEP101, the engine stop duration determiner 43 determines whether the volume of air blown out into the passenger compartment by the blower fan 121 has been set to "High" by an air conditioning switch 36. If the volume of air blown out has been set to "High," then the processing branches off to STEP120, or if it has not been set to "High," then the processing proceeds to STEP102.

In STEP102, the engine stop duration determiner 43 determines if the volume of air blown out into the passenger compartment by a blower fan 121 has been set to "Low." The processing branches off to STEP130 if the volume of air blown out has been set to "Low," or the processing proceeds to STEP104 if it has not been set to "Low."

In STEP104, the engine stop duration determiner 43 determines a permissible room temperature fall duration Td at the sent-out air temperature Bs and at a "Medium" blown-out air volume. Here, when the engine 2 is stopped by the engine stopping/restarting feature, it means that the engine 2 is idling or the vehicle is at a halt in a traffic jam, and the engine 2 is stably running.

Hence, the temperature of a coolant which is heated in a radiator R by the engine 2 and sent out to the heater core H by a pump P exhibits a small fluctuation, so that the quantity of heat of the heater core H when the engine 2 is stopped is assumed to be within a fixed range. Further, if the blower fan 121 is operated after the engine 2 is stopped, the effect for heating the air passing around the heater core H can be obtained until the heat quantity of the heater core H reduces and the temperature falls to a certain degree.

The falling rate of the temperature of the heater core H decreases as the temperature of the air drawn to the blower fan 121 and sent out to the heater core H increases, or increases as the flow rate of the air sent out to the heater core H increases.

Therefore, the engine stop duration determiner 43 determines, in STEP104, a permissible room temperature fall duration Td using the sent-out air temperature Bs detected in STEP100 and the "Medium" blown-out air volume as the parameters. A longer permissible room temperature fall duration Td is determined for a higher sent-out air temperature Bs.

More specifically, the engine stop duration determiner 43 determines the permissible room temperature fall duration Td by referring the sent-out air temperature Bs detected in STEP100 to the map indicating the correlation between the sent-out air temperature Bs for the "Medium" blown-out air volume and the permissible room temperature fall duration Td. The correlation map is determined by conducting experiments or computer simulations on the "Medium" blown-out air volume. The data of the map of the correlation between the sent-out air temperature Bs for the "Medium" blown-out air volume and the permissible room temperature fall duration Td is retained beforehand in a memory (not shown) of a controller 4.

In the following STEP105, the engine stop duration determiner 43 determines whether an air mixing ratio Mr is smaller than a preset judgment value Md. If the air mixing ratio Mr is the judgment value Md or more and the mixing ratio of the air which has been cooled in the evaporator 12 is high, then the engine stop duration determiner 43 proceeds to STEP106 to make an adjustment for shortening the permissible room temperature fall duration Td determined in STEP104.

Meanwhile, if the air mixing ratio Mr is smaller than the judgment value Md and the mixing ratio of the air which has been cooled in the evaporator 12 is low, then the engine stop duration determiner 43 proceeds to STEP107 in FIG. 6 wherein the engine stop duration determiner 43 does not make any correction for shortening the permissible room temperature fall duration Td determined in STEP104.

Further, in STEP120, the engine stop duration determiner 43 uses the sent-out air temperature Bs detected in STEP100 and a "High" blown-out air volume as the parameters to determine a longer permissible room temperature fall duration Td for a higher sent-out air temperature Bs.

More specifically, the engine stop duration determiner 43 determines the permissible room temperature fall duration Td by referring the sent-out air temperature Bs detected in STEP100 to the map indicating the correlation between the sent-out air temperature Bs for the "High" blown-out air volume and the permissible room temperature fall duration Td. The correlation map is determined by conducting experiments or computer simulations on the "High" blown-out air volume.

In this case, if the sent-out air temperature Bs remains the same, then the permissible room temperature fall duration Td obtained from the map of the correlation between the sent-out air temperature Bs for the "High" blown-out air volume and the permissible room temperature fall duration Td will be shorter than the permissible room temperature fall duration Td obtained from the map of the correlation between the sent-out air temperature Bs for the "Medium" blown-out air volume and the permissible room temperature fall duration Td. Incidentally, the data of the map of the correlation between the sent-out air temperature Bs for the "High" blown-out air volume and the permissible room temperature fall duration Td is retained beforehand in a memory of the controller 4.

In the subsequent STEP121, the engine stop duration determiner 43 determines whether the air mixing ratio Mr is smaller than the judgment value Md. If the air mixing ratio Mr is the judgment value Md or more and the mixing ratio of the air which has been cooled in the evaporator 12 is high, then the engine stop duration determiner 43 proceeds to STEP122 to make an adjustment for shortening the permissible room temperature fall duration Td determined in STEP120.

Meanwhile, if the air mixing ratio Mr is smaller than the judgment value Md and the mixing ratio of the air which has been cooled in the evaporator 12 is low, then the engine stop duration determiner 43 proceeds to STEP107 in FIG. 6 wherein the engine stop duration determiner 43 does not make any adjustment for shortening the permissible room temperature fall duration Td determined in STEP120.

Further, in STEP130, the engine stop duration determiner 43 uses the sent-out air temperature Bs detected in STEP100 and a "Low" blown-out air volume as the parameters and determines a longer permissible room temperature fall duration Td for a higher sent-out air temperature Bs.

More specifically, the engine stop duration determiner 43 determines the permissible room temperature fall duration Td by referring the sent-out air temperature Bs detected in STEP100 to the map indicating the correlation between the sent-out air temperature Bs for the "Low" blown-out air volume and the permissible room temperature fall duration Td. The correlation map is determined by conducting experiments or computer simulations on the "Low" blown-out air volume.

In this case, if the sent-out air temperature Bs remains the same, then the permissible room temperature fall duration Td obtained from the map of the correlation between the sent-out air temperature Bs for the "Low" blown-out air volume and the permissible room temperature fall duration Td will be longer than the permissible room temperature fall duration Td obtained from the map of the correlation between the sent-out air temperature Bs for the "Medium" blown-out air volume and the permissible room temperature fall duration Td. Incidentally, the data of the map of the correlation between the sent-out air temperature Bs for the "Low" blown-out air volume and the permissible room temperature fall duration Td is retained beforehand in a memory of the controller 4.

Then, in STEP107 of FIG. 6, an estimated fogging start time determiner 46 determines the estimated fogging start time Tf, which is an estimated time when the fogging of the window glass of the vehicle occurs following a stop of the engine 2, according expression (3) given above.

Further, the estimated fogging start time determiner 46 sets the humidity rise coefficient Kf in the above expression (3) to (a) Ka when the engine 2 is stopped with a refrigeration cycle unit A and the blower fan 121 in operation and the operation of the blower fan 121 is continued after the engine 2 is stopped, or (b) Kb (>Ka) when the engine 2 is stopped with the refrigeration cycle unit A at a halt while the blower fan 121 in operation and the operation of the blower fan 121 is continued after the engine 2 is stopped, and (c) Kc (>Kb) when the engine 2 is stopped with the blower fan 121 at a halt, and the blower fan 121 remains at a halt after the engine 2 is stopped.

Further, if the refrigeration cycle unit A and the blower fan 121 have been in operation until the engine 2 is stopped, the evaporator 12 has been cooled. Therefore, even if the refrigeration cycle unit A is stopped as the engine 2 stops, the air supplied to the evaporator 12 will be dehumidified to a certain degree as long as the blower fan 121 is in operation.

If the blower fan 121 is in operation while the engine 2 is at rest, the convection of air in the passenger compartment retards the fogging of the window glass. Hence, changing the humidity rise coefficient Kf as indicated by expression (4) given above according to the aforesaid three conditions (a) to (c) makes it possible to accurately determine the estimated fogging start time Tf by considering factors contributing to the fogging of the window glass.

In the present second embodiment, the humidity rise coefficient Kf has been set in three different levels, namely, Ka, Kb and kc, according to the aforesaid conditions (a) to (c). Alternatively, however, the humidity rise coefficient Kf may be set in further detailed levels, including, for example, the air volume, the wind direction, and the like of the blower fan 121.

In the subsequent STEP108, the engine stop duration determiner 43 determines whether an estimated fogging start time Tf is earlier than the end of the permissible room temperature fall duration Td. If the estimated fogging start time Tf is earlier than the end of the permissible room temperature fall duration Td, then the processing branches off to STEP140, and the engine stop duration determiner 43 determines the estimated fogging start time Tf as the end of the engine stop duration Ts. Then, the processing proceeds to STEP110 to terminate the processing.

Meanwhile, if it is determined in STEP108 that the permissible room temperature fall duration Td lasts for the estimated fogging start time Tf or longer, then the processing proceeds to STEP109. Then, the engine stop duration determiner 43 sets the permissible room temperature fall duration Td as the end of the engine stop duration Ts, and then proceeds to STEP110 to terminate the processing.

Thus, fogging of the window glass can be obviated while the engine is at rest by determining the estimated fogging start time Tf as the end of the engine stop duration Ts if the estimated fogging start time Tf is earlier than the end of the permissible room temperature fall duration Td.

Subsequently, the engine control unit 44 carries out the procedure indicated by the flowchart in FIG. 7 to stop and restarts the engine 2.

Figure 7:
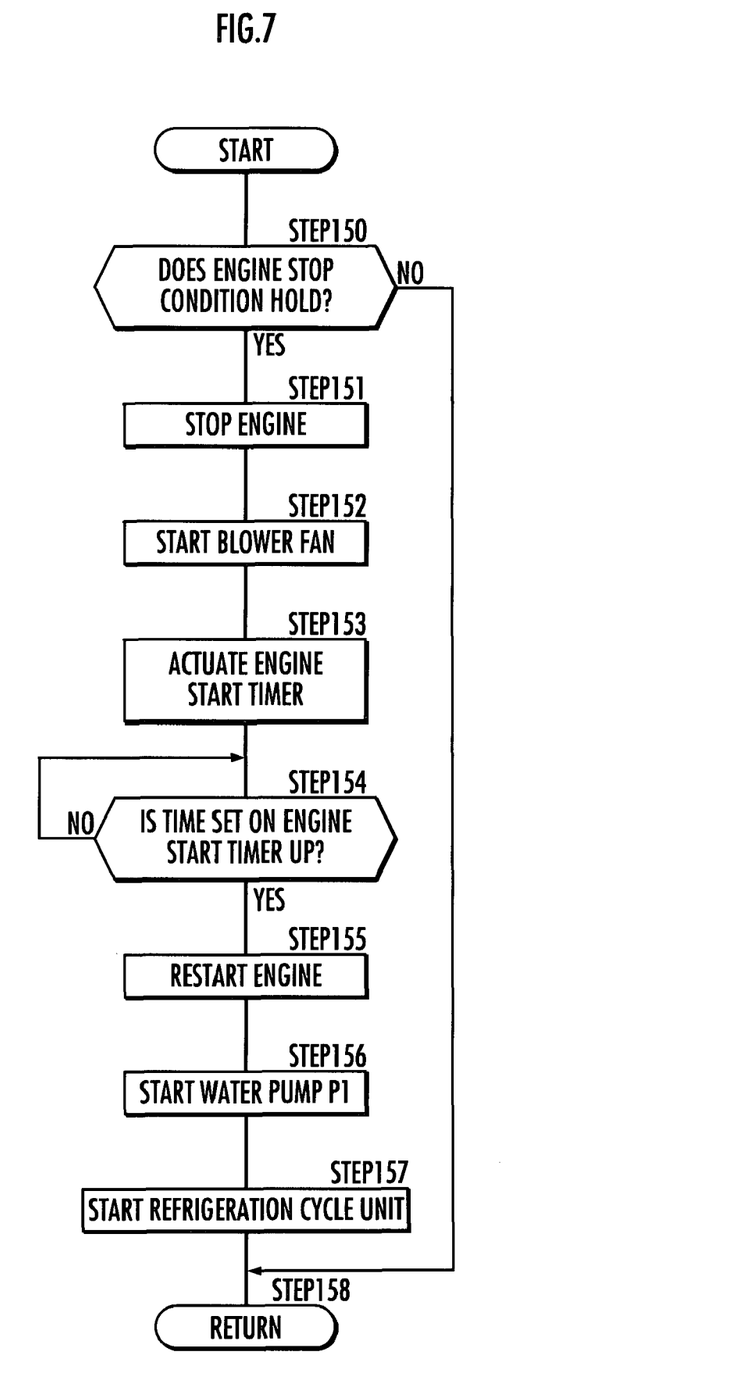
FIG. 7 is a flowchart for temporarily stopping an engine while restricting a temperature fall in a passenger compartment and also restraining window glass from fogging up at the same time in the second embodiment.

In STEP150 of FIG. 7, the engine control unit 44 determines whether the stop condition of the engine 2 holds. Here, regarding the stop condition of the engine 2, the stopping of the engine is enabled if all of the following three conditions are satisfied: (a) a battery 18 has a sufficient remaining amount of charge, (b) an air conditioner 1 has enabled the stop of the engine 2, and (c) the humidity Hs detected by a humidity sensor 30 is lower than the fogging determination humidity Hd.

If the stop condition of the engine 2 holds in STEP150, then the engine control unit 44 proceeds to STEP151 and stops the engine 2, or if the stop condition of the engine 2 does not hold, then the engine control unit 44 branches off to STEP158 to terminate the processing.

After the engine 2 is stopped in STEP151, the engine control unit 44 proceeds to STEP152 to actuate the blower fan 121 (or continue the operation of the blower fan 121 if the blower fan 121 is already in operation). In STEP153, the engine control unit 44 starts an engine start-up timer which takes the engine stop duration Ts, which has been determined in STEP8 or STEP10 in FIG. 2, as the time to measure. When a predetermined time on the engine start-up timer has elapsed in the following STEP154, the engine control unit 44 proceeds to STEP155 to restart the engine 2 and actuates a water pump P in STEP156.

Actuating the water pump P causes the coolant which has been heated by the radiator R to circulate via the heater core H, thereby resuming the heating in the passenger compartment. This makes it possible to protect the passengers in the passenger compartment from feeling uncomfortable due to a further fall in the temperature in the passenger compartment.

In the subsequent STEP157, the engine control unit 44 starts up the refrigeration cycle unit A through the intermediary of an air conditioning control unit 45 and proceeds to STEP158 to terminate the processing. The passenger compartment is thus dehumidified, so that the fogging of the window glass can be restrained.

In the present second embodiment, procedure of STEP107 to STEP109 and STEP140 in FIG. 6 has been carried out to determine the estimated fogging start time Tf, and either the estimated fogging start time Tf or the end the permissible room temperature fall duration Td, whichever is earlier, is applied to the engine stop duration Ts. However, the advantages of the present invention can be obtained also when the permissible room temperature fall duration Td is unconditionally used as the engine stop duration Ts without determining the estimated fogging start time Tf.

Further, in the present second embodiment, the permissible room temperature fall duration Td has been determined on the basis of the three factors, namely, the sent-out air temperature Bs, the blown-out volume, and the air mixing ratio Mr, as shown in FIG. 5. However, the advantages of the present invention can be obtained also by determining the permissible room temperature fall duration Td on the basis of at least one of the factors.

Further, in the present second embodiment, the blown-out air volume has been set at three different levels, namely, high, medium, and low, as illustrated in FIG. 5, to determine the permissible room temperature fall duration Td. Alternatively, however, the blown-out air volume may be set at more detailed levels to determine the permissible room temperature fall duration Td.

Further, in the present second embodiment, it has been determined whether the permissible room temperature fall duration Td should be corrected or not by dividing the air mixing ratio Mr into two levels, namely, whether the air mixing ratio Mr is smaller than the judgment value Md or not, as illustrated in FIG. 5. Alternatively, however, the air mixing ration Mr may be divided into more detailed levels to set the degree of the correction of the permissible room temperature fall duration Td.

The aforesaid embodiments have illustrated the examples in which the present invention has been applied to a hybrid vehicle; however, the present invention is applicable also to any idle-stop vehicle provided with an automatic idle-stop feature for automatically stopping and restarting the engine thereof.

What is claimed is:

1. A controller for a vehicle having an engine,
   a blower fan which supplies air from outside into a passenger compartment or circulates air in the passenger compartment,
   a refrigerant circulation passage, a compressor which is connected to the refrigerant circulation passage and driven by the engine, and
   an evaporator which is connected to the refrigerant circulation passage and which is provided in a circulation passage of air blown into the passenger compartment by the blower fan, and which air-conditions the passenger compartment by operating the compressor and the blower fan, the controller for a vehicle comprising:
   an engine controlling means which stops the engine in the case where a predetermined stop condition holds and restarts the engine thereafter when a predetermined engine stop duration has elapsed;
   a supplied air temperature detecting means which detects the temperature of the air supplied to the evaporator by operating the blower fan;
   an evaporator temperature detecting means which detects the temperature of the air downstream from the evaporator;
   a vehicle condition detecting means which detects the condition under which the vehicle is being placed on the basis of a temperature of the air supplied to the evaporator;
   an air-conditioning control means which sets a target temperature of airblow blown into the passenger compartment under the condition detected by the vehicle condition detecting means,
   a permissible upper limit temperature determining means which determines a permissible upper limit temperature of the evaporator on the basis of the target temperature of airblow; and
   an engine stop duration determining means which determines the engine stop duration on the basis of the temperature detected by the evaporator temperature detecting means and the temperature detected by the supplied air temperature detecting means immediately before the engine is stopped, and which sets a longer engine stop duration as the temperature difference between the temperature detected by the evaporator temperature detecting means immediately before the engine stops and the permissible upper limit temperature increases,
   wherein the engine controlling means continues the operation of the blower fan while the engine is at rest after the stop condition holds and the engine is stopped, then restarts the engine to actuate the compressor when the engine stop duration has elapsed.

2. The controller for a vehicle according to claim 1, wherein the engine stop duration determining means determines a shorter engine stop duration as the amount of air blown into the passenger compartment by the blower fan increases.

3. The controller for a vehicle according to claim 1, wherein the engine stop duration determining means sets a longer engine stop duration in the case where the air in the passenger compartment is supplied to the evaporator by the blower fan while the engine is at rest than in the case where the air outside the vehicle is supplied to the evaporator by the blower fan.

4. The controller for a vehicle according to claim 1, further comprising:
   a fogging determination humidity estimating means which estimates a fogging determination humidity, which is a humidity not causing window glass of the vehicle to fog up under the condition detected by the vehicle condition detecting means;
   a humidity detecting means which detects the humidity in the passenger compartment; and
   an estimated fogging start time determining means which determines a longer estimated fogging start time, which is an estimated time when the fogging of the window glass occurs after the engine is stopped, as the humidity difference between the humidity detected by the humidity detecting means immediately before an engine stop and the fogging determination humidity increases,
   wherein, in the case where the estimated fogging start time is reached before the engine stop duration elapses following an engine stop after the stop condition holds, the engine controlling means restarts the engine and actuates the compressor when the estimated fogging start time is reached.

5. A controller for a vehicle having an engine,
   a blower fan which supplies air from outside into a passenger compartment or circulates air in the passenger compartment,
   a pump driven by the engine to circulate a coolant to a radiator of the engine through the intermediary of a coolant circulation passage, and
   a heat exchanger which is in communication with the coolant circulation passage and which is provided in a circulation passage of air sent into the passenger compartment by the blower fan to heat ambient air by the heat radiated from the coolant circulating in the coolant circulation passage, the controller for a vehicle comprising:
   an engine controlling means which stops the engine in the case where a predetermined stop condition holds, and restarts the engine thereafter when a predetermined engine stop duration has elapsed;
   a sent-out air temperature detecting means which detects the temperature of air sent out to the heat exchanger from the blower fan;

an engine stop duration determining means which determines a longer engine stop duration as the temperature detected by the sent-out air temperature detecting means increases;

a vehicle condition detecting means which detects a condition under which the vehicle is being placed;

a fogging determination humidity estimating means which estimates a fogging determination humidity, which is a humidity not causing window glass of the vehicle to fog up under the condition detected by the vehicle condition detecting means;

a humidity detecting means which detects the humidity in the passenger compartment; and an estimated fogging start time determining means which determines a longer estimated fogging start time, which is an estimated time when the fogging of the window glass occurs following an engine stop, as the humidity difference between the humidity detected by the humidity detecting means immediately before the engine stop and the fogging determination humidity increases, wherein the engine controlling means continues operating the blower fan while the engine is at rest following an engine stop after the stop condition holds, then restarts the engine and actuates the pump when the engine stop duration has elapsed, and the vehicle has a compressor which is connected to a refrigerant circulation passage and driven by the engine, and an evaporator which is connected to the refrigerant circulation passage and which is provided in a circulation passage of air blown into the passenger compartment by the blower fan, and in the case where the estimated fogging start time is reached before the engine stop duration elapses following an engine stop after the stop condition holds, the engine controlling means restarts the engine and actuates the compressor when the estimated fogging start time is reached.

* * * * *